US012566795B2

(12) United States Patent
Park et al.

(10) Patent No.: US 12,566,795 B2
(45) Date of Patent: Mar. 3, 2026

(54) METHOD AND SYSTEM FOR SYNCHRONIZED SEARCH AND RETRIEVAL OF VISUAL WORK INSTRUCTIONS USING ARTIFICIAL INTELLIGENCE

(71) Applicants: Hoseo University Academic Cooperation Foundation, Asan-si (KR); LivinAI Inc., Cheonan-si (KR)

(72) Inventors: Sung Bum Park, Yongin-si (KR); Suehyun Chang, Seoul (KR)

(73) Assignees: HOSEO UNIVERSITY ACADEMIC COOPERATION FOUNDATION, Asan-si (KR); LIVINAI INC., Cheonan-si (KR)

( * ) Notice: Subject to any disclaimer, the term of this patent is extended or adjusted under 35 U.S.C. 154(b) by 0 days.

(21) Appl. No.: 18/901,269

(22) Filed: Sep. 30, 2024

(65) Prior Publication Data

US 2025/0021600 A1 Jan. 16, 2025

Related U.S. Application Data

(63) Continuation of application No. 18/230,220, filed on Aug. 4, 2023, now abandoned.

(30) Foreign Application Priority Data

Aug. 4, 2022 (KR) ........................ 10-2022-0097120

(51) Int. Cl.
| | |
|---|---|
| *G06F 16/71* | (2019.01) |
| *G06F 16/178* | (2019.01) |
| *G06F 16/783* | (2019.01) |
| *G06V 10/86* | (2022.01) |
| *G06V 20/40* | (2022.01) |
| *G06V 20/62* | (2022.01) |

(52) U.S. Cl.
CPC ............ *G06F 16/71* (2019.01); *G06F 16/178* (2019.01); *G06F 16/7844* (2019.01); *G06V 10/86* (2022.01); *G06V 20/41* (2022.01); *G06V 20/49* (2022.01); *G06V 20/62* (2022.01)

(58) Field of Classification Search
CPC .... G06F 16/71; G06F 16/178; G06F 16/7844; G06V 10/86; G06V 20/41; G06V 20/49; G06V 20/62; G11B 27/10
See application file for complete search history.

(56) References Cited

U.S. PATENT DOCUMENTS

| | | | |
|---|---|---|---|
| 11,017,488 B2 * | 5/2021 | Evans | ..................... G06F 16/44 |
| 2021/0064648 A1 * | 3/2021 | Farri | ..................... G06F 16/735 |

* cited by examiner

*Primary Examiner* — Ajay M Bhatia
*Assistant Examiner* — Cindy Nguyen
(74) *Attorney, Agent, or Firm* — LEX IP MEISTER, PLLC

(57) ABSTRACT

The present invention relates to generating training data for performing artificial intelligence. A method and apparatus for generating section data of a visual work instruction for performing artificial intelligence are provided for generating data for searching a user's desired section in a visual work instruction using an artificial intelligence-based text search model.

2 Claims, 6 Drawing Sheets

Separating video segments based on textual information associated with visual work instruction — S100

Generating a text file corresponding to the video segment separated in S100 — S200

Generating synchronization information for the generated text file, and saving the text file data along with the generated synchronization information as segment search data — S300

FIG. 3

METHOD AND SYSTEM FOR SYNCHRONIZED SEARCH AND RETRIEVAL OF VISUAL WORK INSTRUCTIONS USING ARTIFICIAL INTELLIGENCE

BACKGROUND OF THE INVENTION

1. Field of the Invention

The present invention relates to generating data for performing artificial intelligence, and more particularly, to a method and apparatus for generating segment search data of a visual work instruction for performing artificial intelligence, by which method and apparatus data is generated that enables a user to perform a search for a desired segment in a visual work instruction using an artificial intelligence-based text search model.

2. Description of the Related Art

Search technology has been evolving since Google introduced its PageRank technique based on graph theory. These search technologies were based on unsupervised learning, meaning that they were able to search when given only a set of documents. A typical example of a search model based on unsupervised learning is BM25, which shows significantly improved performance when used in conjunction with a query expansion technique called RM3. As an open source, Anserini is widely used in academia and in the field.

Meanwhile, in the field of natural language processing, various search models have been proposed by academic researchers who want to apply AI techniques. For example, deep learning-based search models such as DRMM, KNRM, PACRR, etc. have been proposed. Google's BERT, released in 2018, has shown good performance in various natural language processing fields, and research has continued to utilize transformer or language model-based search models.

In the Ad-Hoc Information Retrieval section of Paper with Code, a website that introduces open-source AI models in each field, one can find the current state-of-the-art (SOTA) of AI-based search models, including Anserini, a search model based on unsupervised learning.

According to a researcher at the University of Waterloo in Canada named Lin, Jimmy, pre-BERT deep learning-based retrieval models, such as DRMM, KNRM, and PACRR, performed similarly to or worse than Anserini, a retrieval model based on unsupervised learning methodologies, while post-BERT models outperformed Anserini (see Lin, Jimmy. "The Neural Hype, Justified! A Recantation."). This can also be seen in the leader board of the Ad-Hoc Information Retrieval section of the Paper with Code above. From these academic studies, we can see that AI-based search models can improve the accuracy of search results.

However, AI-based search models have some limitations.

In order to use AI-based search models for inference, they must first be trained, which requires a large amount of labeled data. Labeled data should basically be processed and provided by humans, which is uneconomical because the cost of labeling is too large given the amount of data required for training.

Another problem is that while search models based on unsupervised learning generally do not suffer from long document lengths, most AI-based search models are limited in the length they can handle. For example, the maximum number of tokens that can be processed by BERT is limited to 512. Therefore, it is not a problem when searching a corpus of short articles, but it is difficult to apply especially when searching for long documents such as papers.

On the other hand, videos and images do not contain textual information by default, so it is difficult to search for them using information retrieval techniques.

PRIOR ART LITERATURE

Non-Patent Literature (Non-Patent Literature 1) [1] https://paperswithcode.com/task/ad-hoc-information-retrieval (Non-Patent Literature 2) [2] MacAvaney, Sean, et al. "CEDR: Contextualized embeddings for document ranking." Proceedings of the $42^{nd}$ International ACM SIGIR Conference on Research and Development in Information Retrieval. 2019.

(Non-Patent Literature 3) [3] Dai, Zhuyun, and Jamie Callan. "Deeper text understandings for IR with contextual neural language modeling. "Proceedings of the $42^{nd}$ International ACM SIGIR Conference on Research and Development in Information Retrieval. 2019.

SUMMARY OF THE INVENTION

The present invention was created to solve the above problems and relates to generating training data for performing artificial intelligence, and more specifically, it aims to provide a method and apparatus for generating segment h data of a visual work instruction for performing artificial intelligence, by which method and apparatus data is generated that enables a user to perform a search for a desired segment in a visual work instruction using an artificial intelligence-based text search model.

To accomplish this objective, there is provided a method for generating segment search data for segment search in a visual work instruction for performing artificial intelligence, comprising, (a) separating a video segment based on textual information associated with the visual work instruction; (b) generating and storing a text file corresponding to the video segment separated in step (a); and (c) generating and storing synchronization information for the text file generated in step (b).

Preferably, the textual information of step (a) includes a description of the visual work instruction as a whole, a task name, a task description, and module names, unit names, and part names associated with the task description.

Preferably, the task name is subdivided into task steps.

Preferably, the synchronization information of step (c) is a start time and an end time of the video content for the text file generated in step (b).

Other aspect of the present invention to accomplish this object is an apparatus for generating segment search data for searching segment in a visual work instruction for performing artificial intelligence, comprising: at least one processor; and at least one memory for storing computer-executable instructions, wherein said computer-executable instructions stored in said at least one memory cause said at least one processor perform the steps of: (a) separating the video segment from the textual information associated with the visual work instruction; (b) generating a text file corresponding to the video segment delimited in said step (a); and (c) generating synchronization information for the text file generated in step (b) above, and storing said text file together with said synchronization information as segment search data.

According to the present invention, an artificial intelligence-based text search model is used to search for a user's desired section in a visual work instruction.

BRIEF DESCRIPTION OF THE DRAWINGS

FIG. 3 is a diagram illustrating synchronization information of a generated text file in the method for generating data for searching segments of a visual work instruction for performing artificial intelligence according to the present invention.

DETAILED DESCRIPTION OF THE INVENTION

Figure 1:
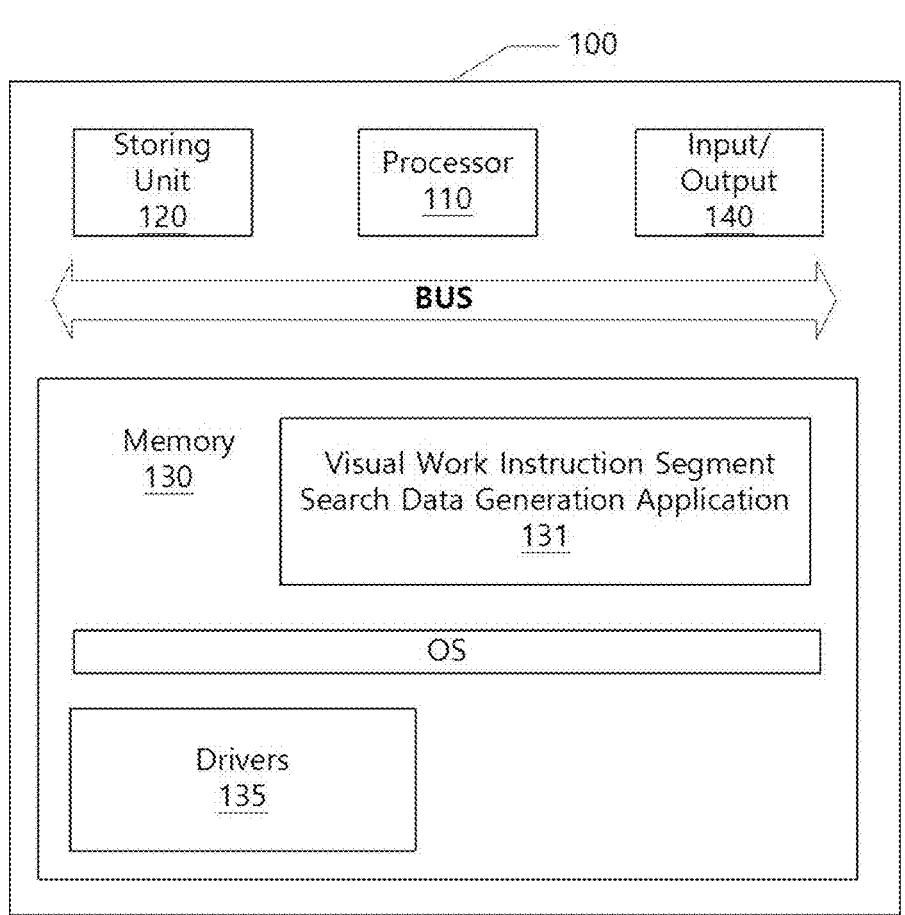
FIG. 1 is a diagram schematically illustrating an apparatus for performing data generation for searching segments of a visual work instruction for performing artificial intelligence according to one embodiment of the present invention.

Hereinafter, exemplary embodiments of the present invention will be described in detail with reference to the accompanying drawings. Prior to the description of the present invention, it will be noted that the terms and wordings used in the specification and the claims should not be construed as general and lexical meanings, but should be construed as the meanings and concepts that agree with the technical spirits of the present invention, based on the principle stating that the concepts of the terms may be properly defined by the inventor(s) to describe the invention in the best manner. Therefore, because the examples described in the specification and the configurations illustrated in the drawings are merely for the preferred embodiments of the present invention but cannot represent all the technical sprints of the present invention, it should be understood that various equivalents and modifications that may replace them can be present.

FIG. 1 is a diagram illustrating an apparatus for performing data generation for segment searching of visual work instructions for performing artificial intelligence according to one embodiment of the present invention, and is a schematic illustration of a configuration of a computing device equipped with a segment search data generation application for visual work instructions.

Referring to FIG. 1, a computing electronic device 100 comprises a processor 110, a non-volatile storage unit 120 for storing programs and data, a volatile memory 130 for storing running programs, an input/output unit 140 for inputting and outputting information to and from a user, and a bus for internal communication between these devices. Running programs may include an operating system and various applications. Although not shown, it includes a power supply.

Figure 2:
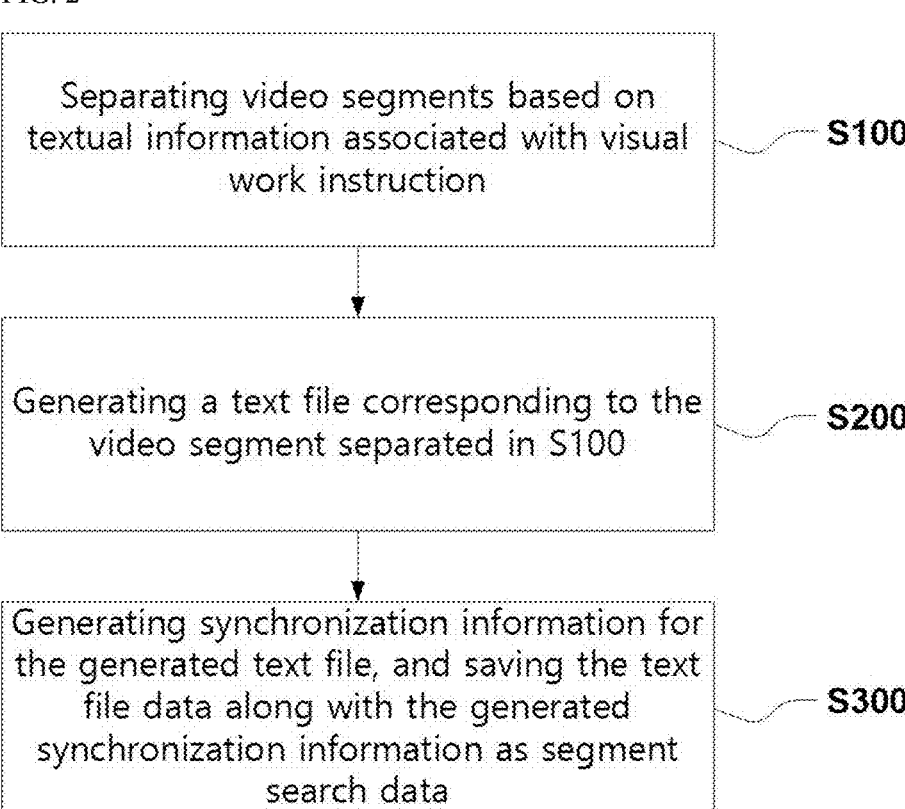
FIG. 2 is a flow diagram illustrating a method for generating data for searching segments of a visual work instruction for performing artificial intelligence according to an embodiment of the present invention.
Figure 3:
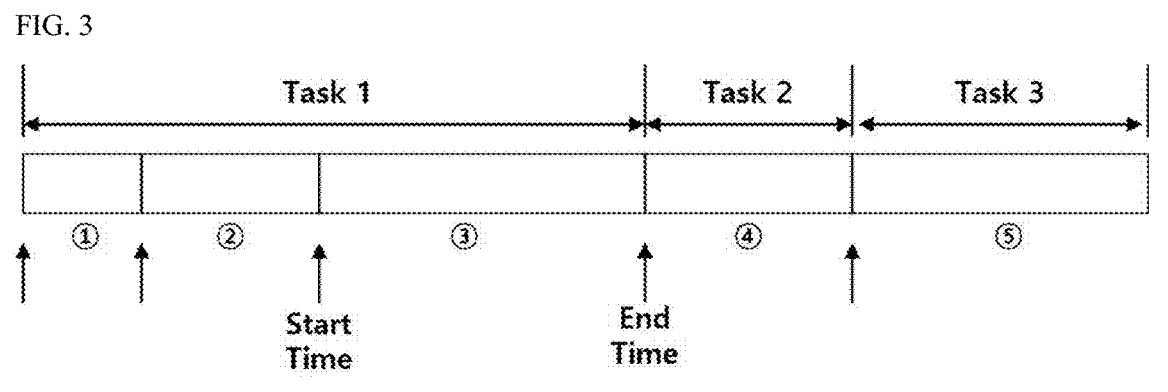
Figure 4:
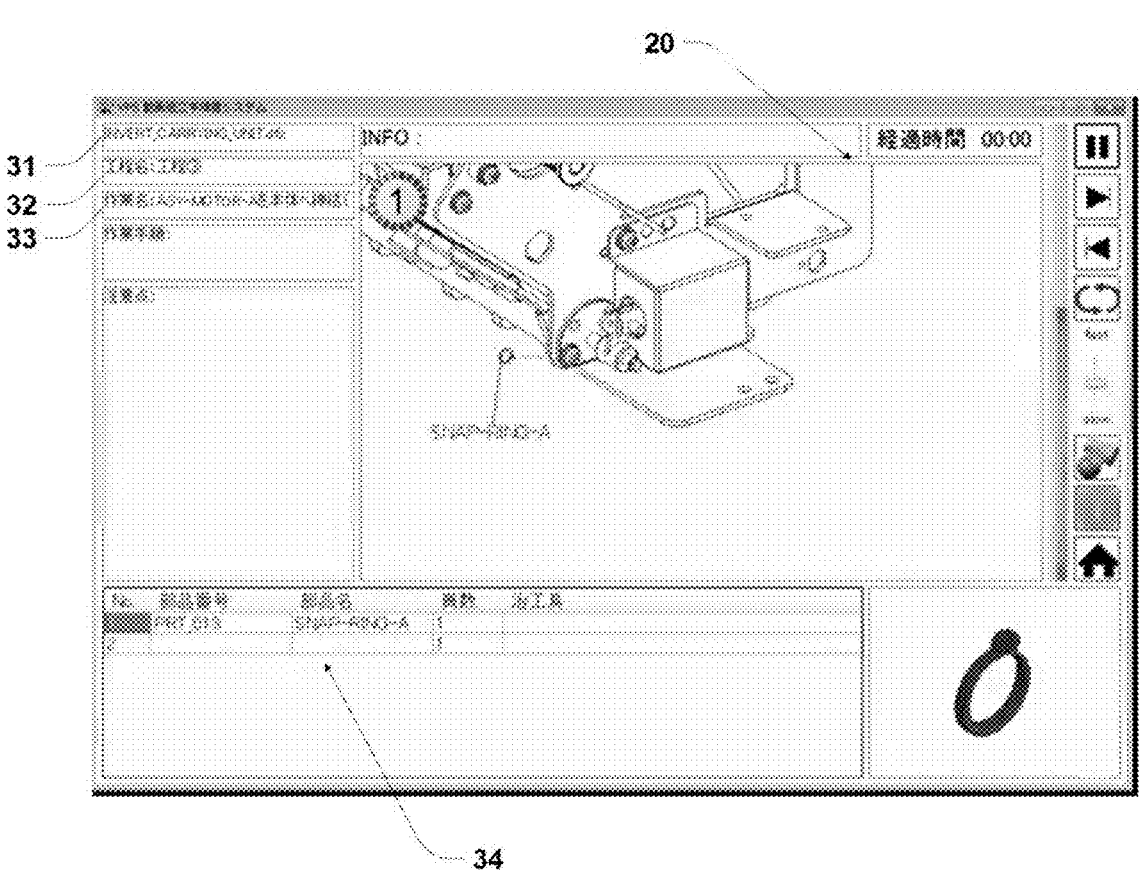
FIGS. 4 through 6 are video screens showing results of segment search using the method for generating data for searching segments of a visual work instruction for performing artificial intelligence according to the present invention.
Figure 5:
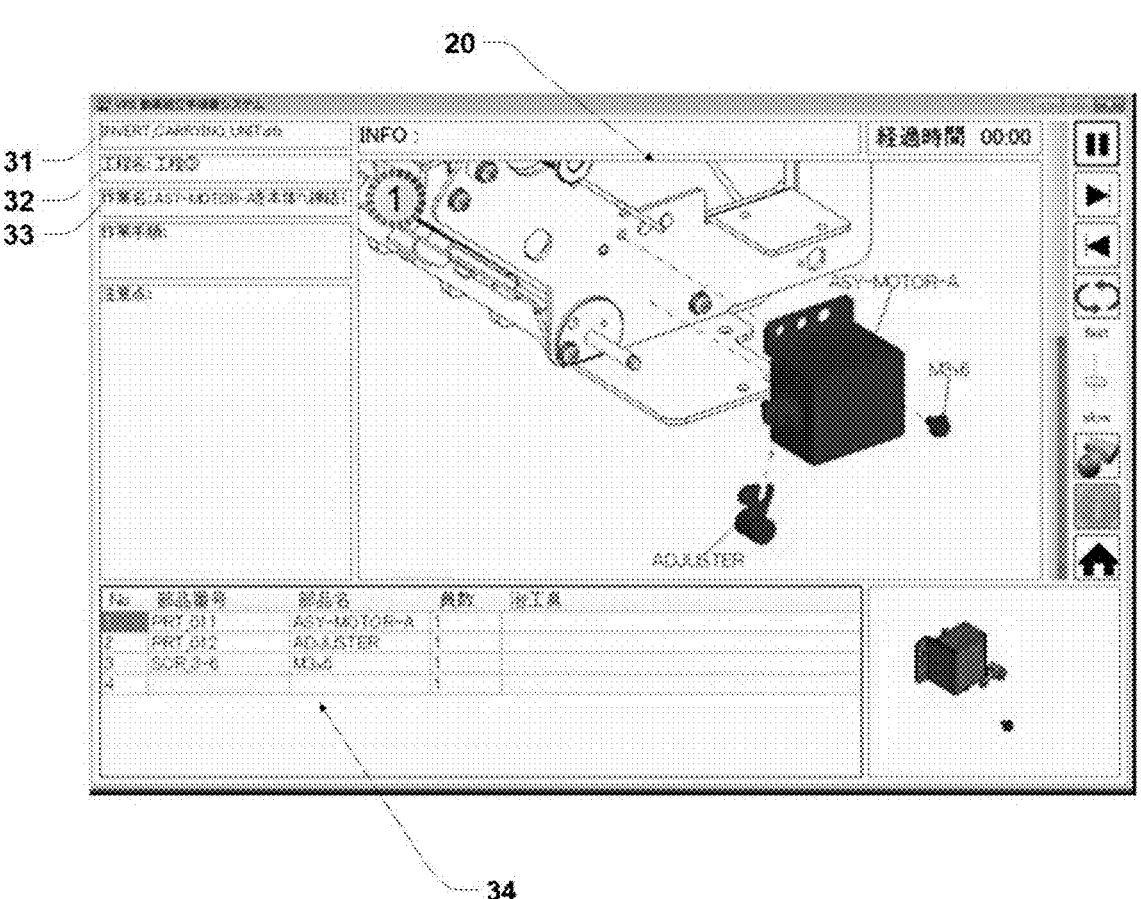
Figure 6:
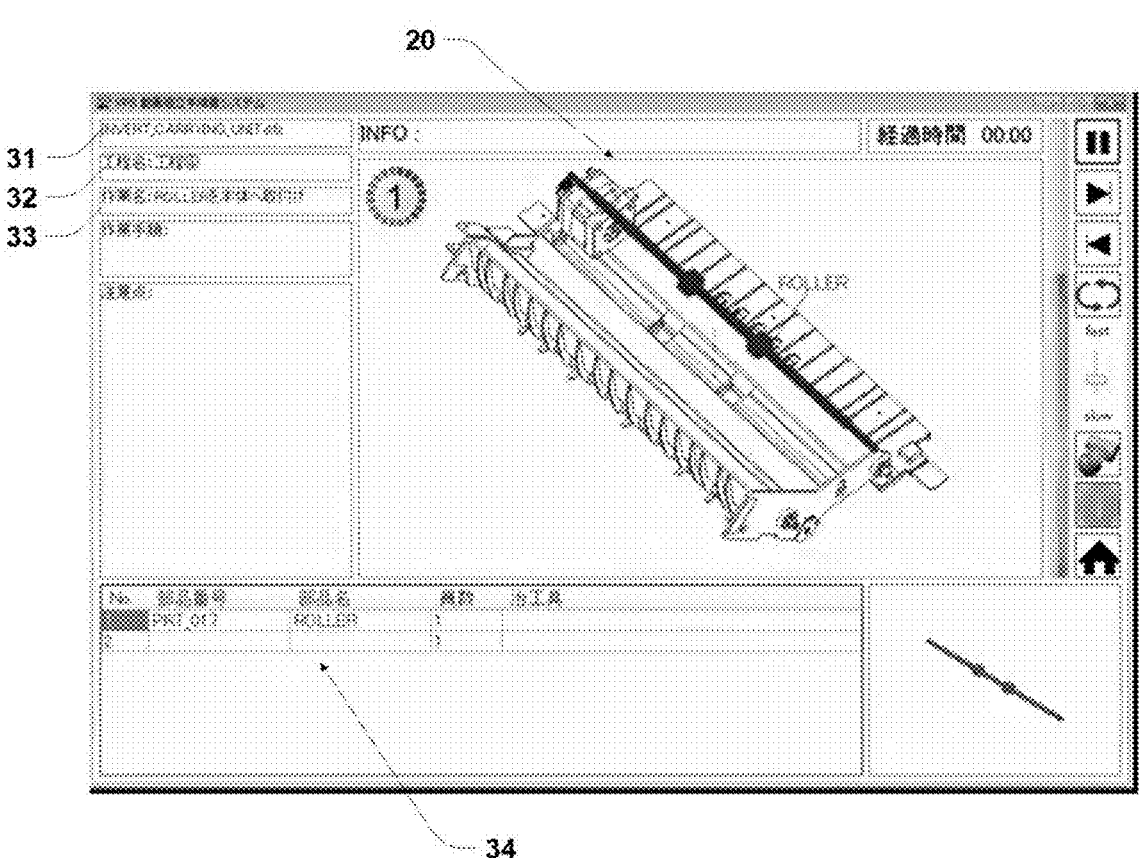

FIG. 2 is a diagram illustrating the flow of a method for generating data for searching segment of a visual work instruction for performing artificial intelligence according to the present invention, FIG. 3 is a diagram illustrating synchronization information of a text file generated in the method for generating data for searching segment of a visual work instruction for performing artificial intelligence according to the present invention, and FIGS. 4 to 6 are video screens showing the results of segment searching using the method for generating data for searching segment of a visual work instruction for performing artificial intelligence according to the present invention.

First, as shown in FIG. 2, the method for generating data for retrieving segments of a visual work instruction for performing artificial intelligence of the present invention identifies video segments from textual information associated with the visual work instruction (S100).

In general, a video is a moving picture characterized by continuously showing multiple frames at a fast speed. The video may be accompanied by voice and music synchronized to a time base. In the present invention, the visual work instruction is accompanied by textual information that was present at the time the work instruction was created as a video. This textual information may be synchronized with the visual work instruction. Although a work instruction for assembling a product is described below as an example, the invention is not limited to such example.

Textual information associated with the visual work instruction includes, but is not limited to, the visual work instruction "overall description", "task name", "task description", and "module name", "unit name", and "part name" associated with the task description. Each module may consist of multiple units, and each unit may consist of multiple parts. For example, for a product called an automobile, there will be a textual description of the entire automobile, and along with the text containing the description of the entire automobile, there will be text for each task name and task description. And for each work description, there is textual information of module name, unit name, and part name. If we assume that a visual work instruction for a product called a car is written with a function-oriented module name, there will be a function-oriented work instruction text along with a description of the entire visual work instruction for the car, and this function-oriented module name will have text information divided into engine function module name, body function module name, transmission function module name, control function module name, etc. In addition, there is a unit name that is separated from each module name, and there is a part name text that is separated from each unit name. Also, "task name" can be subdivided into "task steps" and text information can exist.

In other words, the distinction between video segments in a visual work k instruction is based on the textual information present in the visual work instruction: the visual work instruction's "overall description", "task name", "task description", and the textual information of the "module name", "unit name", and "part name" associated with that task description. For example, a video segment may be distinguished based on the point at which the part name changes, or a video segment may not be distinguished if the part name changes but the unit name does not change. In the latter case, the video segment is usually longer than the former. As such, depending on whether the segments are separated based on the visual work instruction or the synchronized text information, the length of the segments, the separation point, etc. will vary.

Then, a text file corresponding to the video segment contents identified in step S100 is generated (S200). The text file is generated based on the text information such as "description of the whole", "task name", "task description", "module name", "unit name", "part name" related to the task description, etc. in the visual work instruction as described above in step S100. The generated text file corresponds to the content of the video segment that contains all of this textual information. In this case, each video segment includes at least one different text information. For example, if a video segment is separated based on a point where a part name changes, the text file corresponding to that segment may include "description of the video as a whole", "task name", "task description", "module name", "unit name", and "part name". Also, if the video segments are separated based on points where the unit name changes, the text file corresponding to the segment may include a "description of the video as a whole", a "task name", a "task description", a "module name", and a "unit name", in which case the "part name" may not be included or may include all part names associated with the unit.

Next, synchronization information for synchronizing the text file generated in step S200 with the visual work instruction is generated, and the text file data along with the generated synchronization information is stored as segment search data (S300).

FIG. 3 is a drawing to illustrate synchronization information for a text file generated by the method for generating data for searching segments of a visual work instruction for performing artificial intelligence according to the present invention, wherein a bar represents a visual work instruction. It will be assumed and explained that the bar-shaped video of FIG. 3 is a work instruction for a module or a unit of a product called an automobile.

In FIG. 3, the bar-shaped video is divided into segments ①, ②, ③, ④, and ⑤. Of the arrows on both sides of segment ③, the left arrow is the start of segment ③ and the right arrow is the end of segment ③. Meanwhile, the left start time of segment ③ can be the end time of segment ②. In other words, the start time and the end time mean the start time and the end time according to the time axis, which is the synchronization information for the video segments.

And if the video of the work instruction shown in FIG. 3 is arbitrarily assumed to be a video of one specific "unit name", the video of this specific "unit name" will have a "task name", and the video with this "task name" is divided into tasks 1, 2, and 3. In other words, the video sections in the form of bars of task 1, task 2, and task 3 in FIG. 3 exist as segments. In this case, task 1 is divided into segments with segments ①, ②, and ③ consisting of different part names.

FIGS. 4 to 6 are video screens showing the results of a segment search using the method for generating data for searching segment of the visual work instruction for performing artificial intelligence according to the present invention.

As shown in FIGS. 4 to 6, the video is retrieved by a segment search data including textual information related to the video content of the visual work instruction, namely, a text file consisting of a unit name 31, a task step 32 including a task name, a task description 33, a part name 34, and synchronization information of this text file.

The unit name 31 of the visual work instructions corresponding to FIGS. 4 to 6 are the same, and the unit name 31 are divided into task steps 32 including task names.

The text file information related to the video shown in FIG. 4 includes text file information with one (1) part name 34. In other words, the text file information in FIG. 4 is the result of searching for a corresponding video based on the text information of the unit name 31, the task step 32 labeled "process 3", the task description 33, and the information with one (1) part name 34. FIG. 5 is the result of searching for a video with the same unit name 31 and the same task step 32 as in FIG. 4, where "process ③" is labeled, and the task description 33 is the same textual information, but the part name 34 is composed of three texts. Furthermore, FIG. 6 shows the same unit name 31 as in FIGS. 4 and 5, but the task step 32 is labeled as "process ④", and the task description 33 is different from FIGS. 4 and 5, and the part name 34 is different from FIGS. 4 and 5. In other words, when a user wants to search for a desired video, the desired segment can be searched by using a combination of words in a text file.

As shown above, although the present invention has been described by means of limited embodiments and drawings, the invention is not limited thereby and various modifications and variations can be made by one having ordinary knowledge in the technical field to which the invention belongs within the equitable scope of the technical idea of the invention and the claims of the patent which will be described below.

What is claimed is:

1. A method for providing a search for a segment that a user is looking for in a video work instruction, comprising:
   (a) separating a video segment from text information associated with the video work instruction, wherein the text information has a hierarchical structure including a module name, a unit name belonging to the module name, and a part name belonging to the unit name, and wherein the separating is performed based on a detection of a change in at least one of the unit name or the part name within the text information;
   (b) generating and storing a text file corresponding to the video segment separated in step (a) based on the text information, wherein the generated text file integrates all of a description of an entire video work instruction, a task name, a task description, and the module name, the unit name, and the part name corresponding to the separated video segment into a single document for the separated video segment, and wherein, when the separating is performed based on a change in the unit name, the generated text file includes all part names associated with the unit name, whereas when the separating is performed based on a change in the part name, the generated text file includes a specific part name corresponding to the separated video segment;
   (c) generating and storing synchronization information for the video segment separated in step (a) and the text file generated in step (b);
   (d) searching for a text file corresponding to a query input by the user from among the stored text files;
   (e) determining a video segment corresponding to the query input by the user by referring to the synchronization information of the searched text file; and
   (f) providing the video segment corresponding to the query input by the user, determined in step (e), to the user,
   wherein the synchronization information of step (c) is a start time and an end time of the video content for the text file generated in step (b).

2. An apparatus for providing a search for a segment that a user is looking for in a video work instruction, comprising:
   at least one processor; and
   at least one memory for storing computer-executable instructions,
   wherein the computer-executable instructions stored in the at least one memory cause the at least one processor to perform:
   (a) separating a video segment from text information associated with the video work instruction, wherein the text information has a hierarchical structure including a module name, a unit name belonging to the module name, and a part name belonging to the unit name, and wherein the separating is performed based on a detection of a change in at least one of the unit name or the part name within the text information;

(b) generating and storing a text file corresponding to the video segment separated in step (a) based on the text information, wherein the generated text file integrates all of a description of an entire video work instruction, a task name, a task description, and the module name, the unit name, and the part name corresponding to the separated video segment into a single document for the separated video segment, and wherein, when the separating is performed based on a change in the unit name, the generated text file includes all part names associated with the unit name, whereas when the separating is performed based on a change in the part name, the generated text file includes a specific part name corresponding to the separated video segment;

(c) generating and storing synchronization information for the video segment separated in step (a) and the text file generated in step (b);

(d) searching for a text file corresponding to a query input by the user from among the stored text files;

(e) determining a video segment corresponding to the query input by the user by referring to the synchronization information of the searched text file; and (f) providing the video segment corresponding to the query input by the user, determined in step (e), to the user, wherein the synchronization information of step (c) is a start time and an end time of the video content for the text file generated in step (b).

* * * * *